March 13, 1962  R. L. WOHLFORTH  3,024,584
APPARATUS FOR PACKAGING ANNULAR ARTICLES
Filed Aug. 17, 1960  10 Sheets-Sheet 1

INVENTOR.
RALPH L. WOHLFORTH
BY
Davis, Hoxie, Faithfull & Hapgood
ATTORNEYS

Fig. 4.

INVENTOR.
RALPH L. WOHLFORTH
BY Davis, Hoxie, Faithfull & Hapgood
ATTORNEYS

Fig. 8.

INVENTOR.
RALPH L. WOHLFORTH

United States Patent Office 3,024,584
Patented Mar. 13, 1962

3,024,584
APPARATUS FOR PACKAGING ANNULAR ARTICLES
Ralph L. Wohlforth, Red Bank, N.J., assignor to Phelps Dodge Copper Products Corporation, New York, N.Y., a corporation of Delaware
Filed Aug. 17, 1960, Ser. No. 50,225
27 Claims. (Cl. 53—204)

This invention relates to the packaging of articles of generally annular shape, such as a length of tube in coiled form. More particularly, the invention relates to an improved apparatus for packing such articles.

In my copending application S.N. 8,265, filed February 12, 1960, for "Packaging of Coiled Tubes," there is disclosed a carton for packaging an annular article, and the apparatus of the present invention is particularly suited for effecting certain operations involved in packaging the annular article in such a carton.

The carton disclosed in my aforementioned copending application comprises a pair of opposed sheet-like members, such as sheets of cardboard, each having a central opening and inner and outer peripheral portions. The inner peripheral portion of each member has cuts defining a series of inner tabs which, before folding, define a central polygonal opening, this inner portion also having fold lines forming a polygonal figure at the corners of which the cuts terminate. These inner tabs of each member are folded on the corresponding fold lines toward the opposing member and overlap the inner tabs thereof, and means are provided for securing each inner tab of each member in overlapping relation to a corresponding inner tab of the opposing member and with the intersecured tabs extending in opposite directions from their respective sheet-like members, such securing means being preferably an adhesive applied to the tabs. The outer peripheral portion of each sheet-like member has cuts defining a series of outer tabs and also has outer fold lines forming a generally circular figure at which these last cuts terminate. The outer tabs of each sheet-like member are folded on the respective outer fold lines toward the opposing member, and the outer periphery of the carton comprises a tape engaging the outer tabs of at least one of the sheet-like members, so as to hold the outer tabs in position to form a generally annular retaining wall surrounding the packaged article which, in turn, surrounds the polygonal closure formed by the inner tabs.

With this construction, the carton can be readily assembled around a coil tube by placing the coil between the two opposed sheet-like members, folding the inner tabs and securing them as described, and applying the tape to the outer tabs after folding them to form the annular retaining wall. The resulting carton not only has an attractive appearance but also can be handled and transported easily. That is, the circular outer periphery of the carton allows it to be rolled smoothly along a floor, and by reason of the polygonal shape of the closure formed by the tabs at the inner periphery of the carton, the latter may be easily gripped and held manually from within the central opening of the carton.

A principal object of the present invention is to provide an apparatus for use in packaging generally annular-shaped articles in a carton as described above.

A further object is to provide an apparatus by which such articles can be packaged rapidly and with a minimum of manual effort.

An apparatus made according to the invention comprises a support engageable with one of the sheet-like carton members and adapted to support this member with the annular article to be packaged resting on the member, this support having an opening for passage of tab-folding elements from below the support into engagement with the inner tabs of the sheet-like member. A head is mounted above the support for reciprocating movements relative to the support and carries pressing and folding means operable in response to movement of the head toward the support to press the other or upper of the sheet-like members against the annular article and fold the inner tabs of this upper member toward the support opening. A second head is mounted below the support for reciprocating movements relative thereto and carries folding elements movable by the head through the support opening to fold the inner tabs of the first or lower sheet-like member toward the first head, whereby these members are partially assembled around the article with the folded inner tabs of the respective members in overlapping relation and defining a central polygonal opening substantially larger than the polygonal openings defined by the unfolded tabs. The apparatus also comprises a rotary table for supporting this partial assembly of sheet-like members around the article and to which the partial assembly may be transferred from the previously described support. An outer tab-folding station and a tape applicator station are located in adjacent relation opposite the peripheral portion of the table, and a hub on the table is engageable closely in the enlarged polygonal opening in the partial assembly to locate it on the table in relation to these stations. Means are provided for driving the table in the direction to move the outer tabs of the partial assembly first through the folding station and then through the tape applicator station, whereby the tape forming the periphery of the carton is applied to the outer tabs when each pair of opposed outer tabs on the respective members have been folded towards each other substantially perpendicularly to the planes of the members by passage through the folding station.

In the preferred form of the apparatus for folding the inner tabs of the sheet-like members, a polygonal locating hub is adapted to fit closely in the polygonal openings defined by these inner tabs before they are folded, this hub being in a fixed angular position relative to the folding elements for the inner tabs of the lower member and relative to the folding means for the inner tabs of the upper member. Thus, by placing the sheet-like members on the table so that the polygonal hub fits into the polygonal holes formed by the unfolded inner tabs, the assembly is automatically positioned for engagement of the inner tabs by the respective folding elements for the lower tabs and the respective folding means for the upper tabs. The locating hub may be mounted for movement through the supporting opening, thereby permitting retraction of the hub to a position below the support to facilitate removal of the carton members and annular article from the support when the inner tab-forming operations are completed, and permitting advance of the hub to a position above the support where it can locate and hold the sheet-like members in the proper angular positions for the inner tab-folding operations. The folding elements for the inner tabs of the lower sheet-like member are arranged to surround the locating hub and to move upwardly through the support opening independently of the locating hub. The pressing and tab-folding means operable on the upper sheet-like member preferably comprise a yielding presser plate carried by the first head and engageable with the upper sheet-like member around its central polygonal opening, this plate being yieldable relative to the first head upon advance movement thereof toward the support when the sheet-like members and annular article are compacted between the support and the presser plate, such means also including fingers pivotally mounted on the first head and having parts engageable with the presser plate to swing the fingers outwardly against the inner tabs of the upper sheet-like member in response to this advance movement of the first head.

In the preferred form of the apparatus for folding the outer tabs and applying the tape thereto, the tab-folding station includes a plurality of rollers rotatable on axes parallel to the table axis and having peripheries engageable consecutively by each pair of opposed outer tabs on the respective sheet-like members as the table rotates, these rollers having their peripheries configurated to fold the opposed tabs progressively inwardly through at least 90° from the planes of the respective sheet-like members. The last of these rollers may have a concave periphery for clamping the opposed tabs into abutting relation at their ends while holding the tabs substantially perpendicularly to the planes of the respective members, so that the folded tabs are in proper position for the application of the tape at the subsequent tape-applicator station. The latter preferably includes a pressure roller operable to press the tape against the folded tabs so as to make the tape adhere to the tabs by means of an adhesive, a tape supply roll for delivering tape to the pressure roll, and a tape cutter movable to a position for cutting the applied tape from the pressure roller after the table has been rotated sufficiently to apply the tape around the entire periphery of the carton.

The tab-folding rollers of the folding station may be mounted on a common support which is adjustable generally radially of the table to accommodate cartons of different diameters. Likewise, the parts of the tape applicator station may be mounted on a common support similarly adjustable for the same purpose. Preferably, a transfer device is provided on which the partially assembled carton members from the inner tab-folding apparatus are movable into overlying relation to the rotary table, and means are provided for elevating the rotary table relative to this device to lift the partial assembly into cooperative relation to the outer tab-folding station and the tape applicator station.

These and other features of the invention are described in reference to the accompanying drawings illustrating a preferred form of the packaging apparatus. In the drawings.

To facilitate an understanding of the new apparatus and its operation, the carton itself will first be described. As shown in FIGS. 16–20, the carton comprises two sheet-like members 10 and 10a (FIGS. 18–20). As these two members are identical to each other, only the member 10 will be described specifically by reference to FIGS. 16 and 17.

Figure 16:
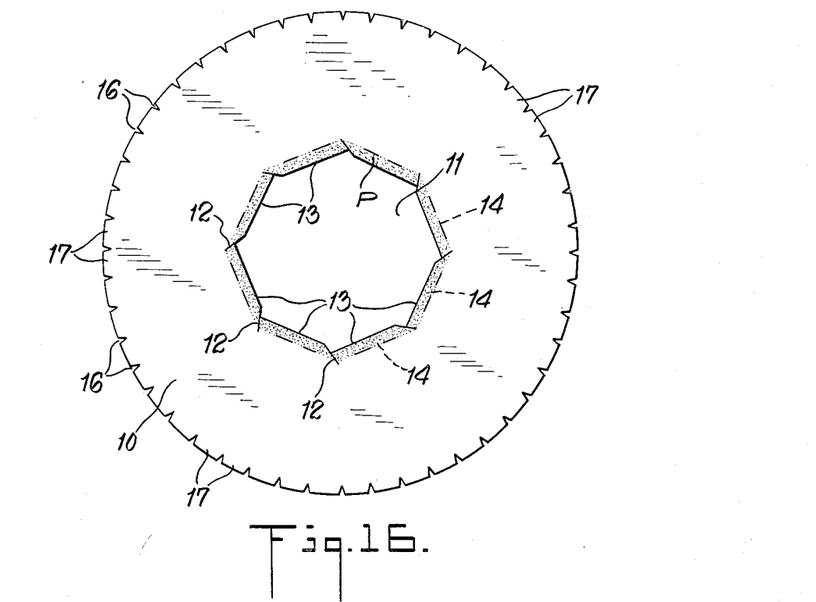
FIG. 16 is a plan view of one of the two sheet-like members of the carton, showing the inner and outer tabs before they are folded toward the opposing member.
Figure 17:
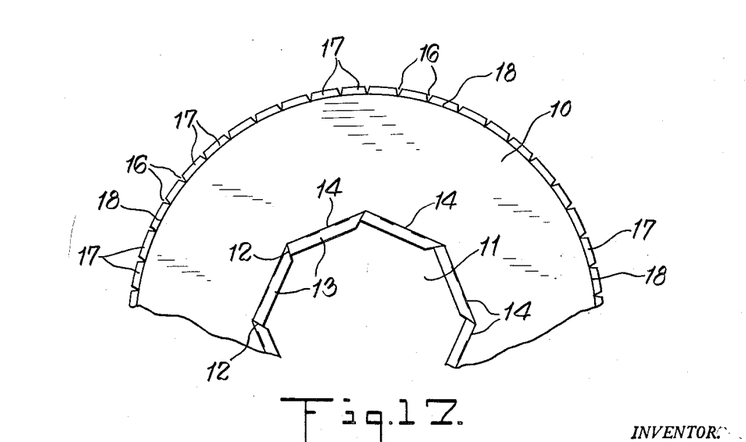
FIG. 17 is a plan view of part of the sheet-like member illustrated in FIG. 16 but showing the opposite side of the member.
Figures 18, 19, 20:
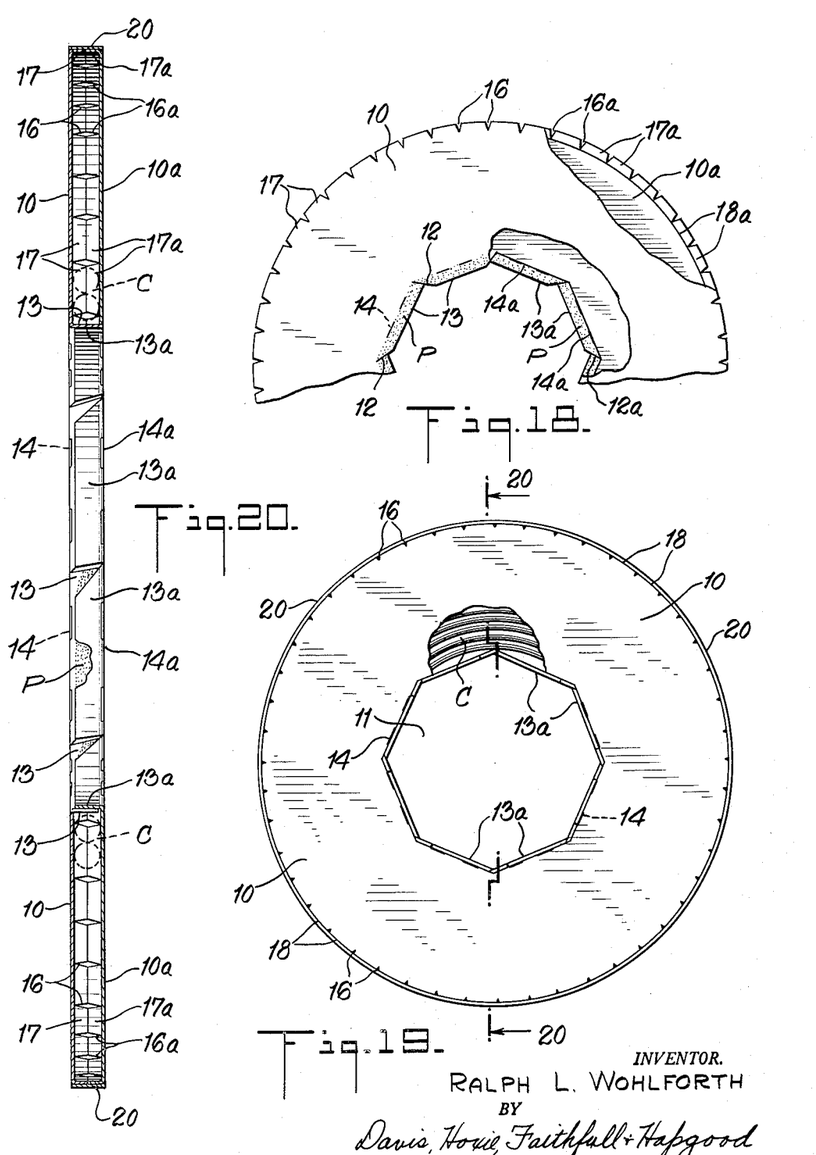
FIG. 18 is a plan view of the two sheet-like members arranged in opposed relation prior to folding of the respective tabs, parts of the upper member being broken away to show parts of the lower member.
FIG. 19 is a plan view of the completed carton, part of the upper sheet-like member being broken away to show the packaged article.
FIG. 20 is an enlarged sectional view on the line 20—20 in FIG. 19.

As shown in FIGS. 16 and 17, the sheet-like member 10 is a generally annular sheet of a foldable form-retaining material, such as multi-ply cardboard stock, having a central opening 11. The sheet 10 has a substantially circular outer periphery and a polygonal inner periphery which defines the opening 11. At its inner peripheral portion, the sheet has cuts 12 defining a series of inner tabs 13 and also has scoring or fold lines 14 forming a polygonal figure at the corners of which the cuts 12 terminate.

At its outer peripheral portion, the sheet-like member 10 has cuts 16 extending radially inward from the circular periphery and defining a series of outer tabs 17. The outer peripheral portion also has scoring or outer fold lines 18 forming a substantially circular figure at which the cuts 16 terminate. The spacing between adjacent outer cuts is considerably less than the spacing between adjacent inner cuts 12, thereby providing a relatively short fold line 18 for each of the outer tabs 17. The outer radial cuts 16 are somewhat V-shaped to facilitate folding the tabs 17 when assembling the carton, as will be described in detail presently.

The cuts 12 in the inner peripheral portion of the member 10 do not extend radially, but each of these cuts intersects a radius of the corresponding circular figure 18 formed by the outer fold lines for the tabs 17. Also, each inner cut 12 diverges from a next adjacent cut 12 in extending from the central opening 11, and each tab 13 has an edge overlapping an edge of one adjacent tab and has an opposite edge overlapped by an edge of the other adjacent tab.

In assembling the carton, the two sheet members 10—10a are placed in opposing relation with the outer cuts 16 of one sheet in registry with corresponding outer cuts 16a of the other sheet, as shown in FIG. 18. (The parts of the sheet 10a are given the same reference numerals as the corresponding parts of the sheet 10 but with the subscript "a.") The article to be packaged, in this case the coiled tube C shown in FIGS. 19–20, is placed between the two sheets before they are arranged as shown in FIG. 18, so that the assembly operations now to be described will form the carton around the article. Each inner tab 13—13a of each sheet 10—10a is folded along its corresponding fold line 14 or 14a toward the other sheet and into overlapping relation to the corresponding opposed inner tab of such other sheet, as best shown in FIG. 20. As there shown, the inner tabs 13 of the sheet member 10 are first folded inwardly toward the opposed sheet member 10a, and then the inner tabs 13a of the latter sheet are folded inwardly toward the opposed sheet 10, so that the tabs 13a border upon the central opening 11 formed by the thus assembled sheets. As will be apparent from FIG. 20, the tabs 13—13a are each of a length approximating the outside diameter of the coiled tube C to be packaged (the tube being wound in a flat coil), so that the inner tabs 13 terminate at or closely adjacent the inner surface of the opposing sheet member 10a. The outer surfaces of the tabs 13 and the inner surfaces of the tabs 13a are provided with an adhesive P which serves, when the folded inner tabs of one sheet are pressed against the corresponding folded tabs of the other sheet, to secure each inner tab of each sheet in overlapping relation to a corresponding inner tab of the opposing sheet. Accordingly, the adhesive or securing means P functions to secure the opposed sheet members 10—10a to each other through their respective inner tabs 13—13a, these intersecured tabs extending in opposite directions from their respective sheet members. In this way, the inner tabs 13—13a form a double-walled closure at the inner peripheral portion of the annular space between the opposed sheets 10—10a, the closure formed by tabs 13—13a having a polygonal configuration and being surrounded by the coiled tube C (FIG. 19).

The outer tabs 17—17a of each sheet member 10—10a are folded along their corresponding fold line 18 or 18a toward the opposing sheet member. However, these outer tabs are considerably shorter (in radial dimension) than the inner tabs 13—13a so that the outer tabs of each sheet member, when thus folded, terminate short of overlapping relation to the outer tabs of the opposing sheet member, as best shown in FIG. 20. To complete the carton, a tape 20 is extended completely around the outer periphery of the assembled sheet members 10—10a and secured to the outer surfaces of the folded outer tabs 17—17a. The tape 20, as shown, is a paper strip having an adhesive (not shown) on the side of the tape engaging the outer tabs 17—17a, so that the tape is secured to these tabs. Thus, the tape 20 and the outer tabs 17—17a form at the outer peripheral portion of the carton a substantially circular double-walled closure for the annular space between the opposed sheet members 10—10a, this circular outer closure surrounding the coiled tube C.

The configurations of the tabs 13—13a and 17—17a are such that the tabs can be readily folded to their final positions without interfering with each other. The tape 20, as shown, is of a width equal to the distance between the outer surfaces of the main portions of the opposed sheet members 10—10a when these portions engage the opposite surfaces of the flat coil C, so that the opposite edges of the tape are flush with these surfaces, respectively, of the sheet members. In other words, the width of the tape 20 is approximately equal to the outer diameter of the coiled tube C plus twice the thickness of the sheet material from which the members 10—10a are made.

The resulting carton has an attractive appearance and forms a durable and secure package for the coil C, which will normally occupy most of the annular space within the carton so that the inner and outer turns of the coil will be at or near the closures formed by the inner tabs 13—13a and the outer tabs 17—17a, respectively. By virtue of the polygonal shape of the central opening 11 extending through the carton, manual handling of the carton is facilitated; and by virtue of its substantially circular outer periphery, the carton may be easily transported by rolling it on edge. The coil C can be easily removed from the carton when desired, as by breaking the overlapping inner tabs 13—13a away from each other, and tearing one of the sheets 10 or 10a outwardly from the thus broken portion, or by slitting the peripheral tape 20 along the medial line between the ends of the opposed outer tabs 17—17a and tearing one of the sheets 10 or 10a inwardly from the thus slit portion, so as to detach the sheet members from each other sufficiently to enable removal of the coil.

I shall now describe the apparatus for packaging the annular article C in the carton previously described.

Figure 1:
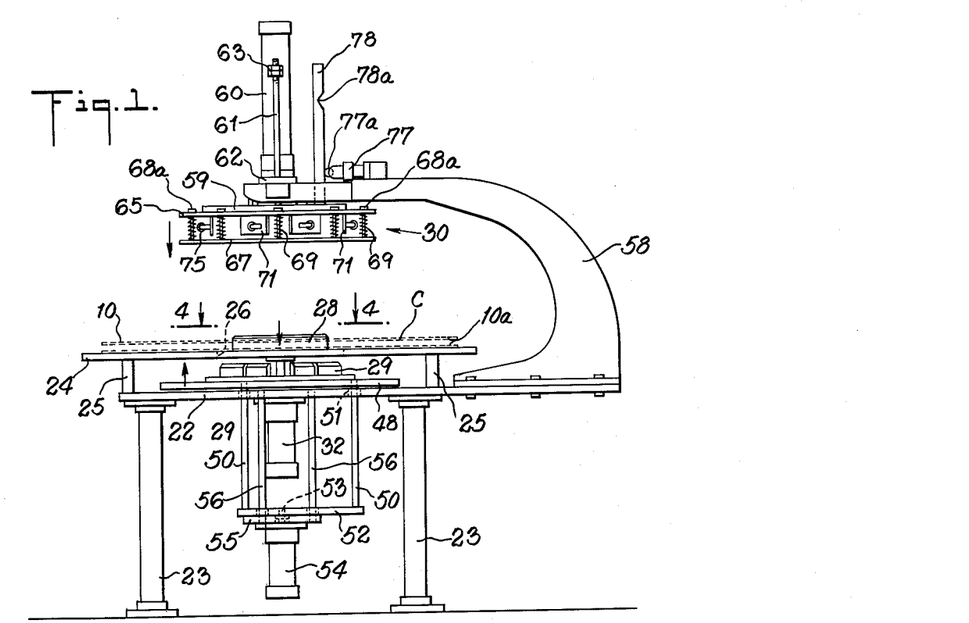
FIGS. 1 and 2 are side elevational and plan views, respectively, of that part of the apparatus which folds the inner tabs of the sheet-like members.
Figure 2:
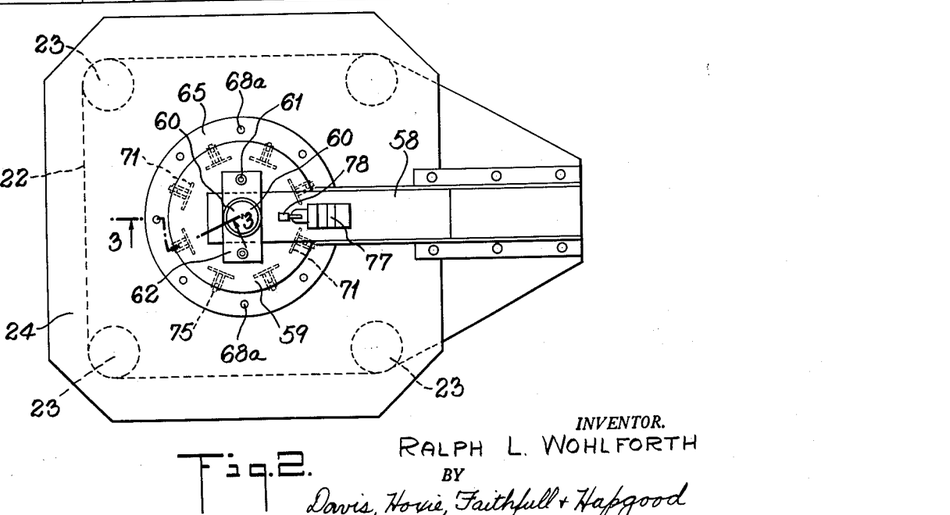
Figure 3:
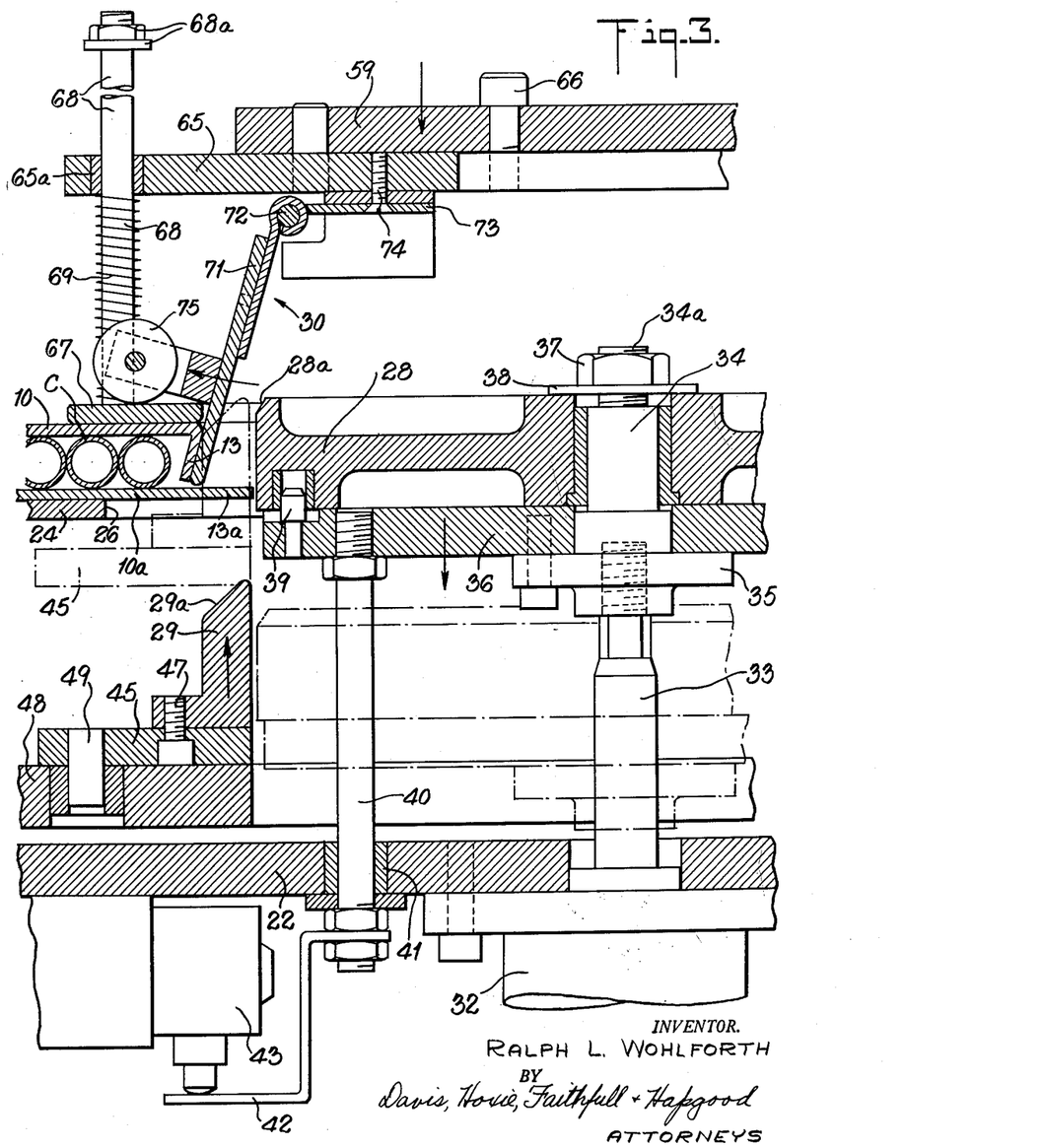
FIG. 3 is a vertical sectional view on the line 3—3 in FIG. 2.

The apparatus for folding and interconnecting the inner tabs 13—13a, as illustrated in FIGS. 1-7, comprises a horizontal bed plate 22 having supporting legs 23 adapted to rest on the floor (FIG. 1). A plate 24 is rigidly mounted on bed plate 22 in spaced relation above the bed plate by means of vertical spacers 25, the upper plate 24 forming a support for the sheet-like members 10—10a and the annular article C to be packaged between these members, as illustrated in broken lines in FIG. 1. As there shown, the flat sheet 10a is placed directly on support 24, the annular article C is placed on the sheet 10a, and the flat sheet 10 is placed on the article C, the polygonal or octagonal openings 11 in the sheets (as well as the central opening of the annular article C) being aligned with an opening 26 in the support 24. The support opening 26, as shown in FIG. 3, is substantially larger than the octagonal openings 11 defined by the unfolded inner tabs 13—13a and is substantially larger than the enlarged octagonal opening 11 in the finished carton as shown in FIG. 19.

The parts operating on the carton members 10—10a are a positioning hub 28 of octagonal shape, tab-folding elements 29, and pressing and tab-folding means 30. The octagonal hub 28 is adapted to fit closely in the octagonal openings 11 defined by the unfolded inner tabs 13—13a of the sheet members so as to locate these members relative to each other and to the parts 29 and 30, whereby the latter parts can engage and fold the inner tabs of the lower and upper sheet members, respectively, so that each inner tab on the lower member 10a is folded into overlapping relation to an opposed inner tab of the upper sheet 10.

The positioning hub 28 is adapted to be advanced and retracted through the support opening 26 by an actuator in the form of a cylinder 32 containing a piston (not shown). The piston may be actuated hydraulically or pneumatically in cylinder 32, the latter being bolted or otherwise secured at its upper end to the lower surface of bed plate 22. As shown particularly in FIG. 3, a piston rod 33 extends vertically from cylinder 32 through an opening in bed plate 22 and has a threaded connection at its upper end with a stub shaft 34. A shoulder 35 on shaft 34 is bolted to a plate 36. The stub shaft or extension of piston rod 33 extends through plate 36 and through a central opening in hub 28. At its upper end, the stub shaft 34 is threaded, as shown at 34a, and carries a nut 37 which clamps a washer 38 against the top central portion of hub 28. Thus, the octagonal hub 28 is clamped securely on plate 36 which is rigidly connected to piston rod 33. A locating pin 39 on plate 36 is received in an opening in the peripheral portion of the overlying hub 28 so as to locate the hub angularly relative to plate 36. A guide rod 40 is rigidly secured to plate 36 and extends downwardly through a bushing 41 in bedplate 22, in which rod 44 has a close sliding fit.

The octagonal hub 28 is shown in its advanced or raised position in FIG. 3, where it serves to locate the sheet members 10—10a by engagement of the sides of the hub with the ends of corresponding inner tabs 13—13a of the sheets before the tabs are folded. By means of the piston rod 33, the hub 28 may be lowered through the support opening 26 to the position shown in broken lines in FIG. 3, thereby facilitating removal of the carton parts 10—10a and the intermediate annular article C after completion of the inner tab-folding operations. When the next carton is to be assembled, the piston in cylinder 32 is actuated to return hub 28 to its raised or locating position. Regardless of the vertical position of hub 28, it is held by the guide rod 40 against rotation about the hub axis (that is, in a predetermined angular position) so that the flat sides of the octagonal hub are properly aligned angularly with the other parts of the apparatus. As shown in FIG. 3, a finger 42 is secured to the lower end of guide rod 40; and when the hub 28 reaches its raised or locating position, the finger 42 operates a limit switch 43 secured to bed plate 22 and operatively connected by suitable means (not shown) to cylinder 32 so as to cut off the supply of fluid to the cylinder and thereby arrest the upward movement of hub 28.

Figure 4:
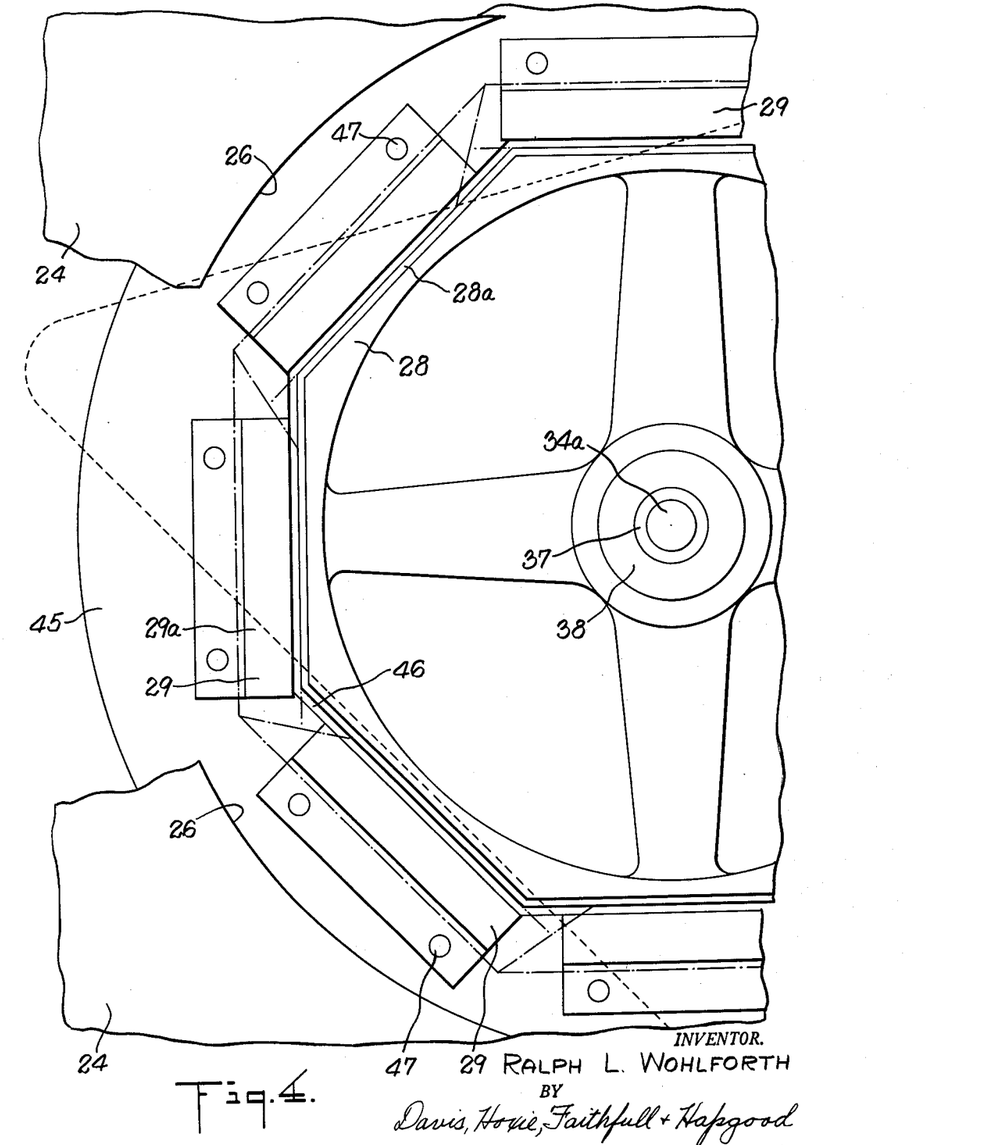
FIG. 4 is a plan view on the line 4—4 in FIG. 1, with parts broken away.

The tab-folding elements 29 are in the form of vertical fingers, one for each of the eight inner tabs 13a of the lower sheet 10a. As best shown in FIGS. 3 and 4, the fingers 29 are rigidly secured to a flat annular member 45, the inner periphery of which is octagonal to correspond to the shape of the locating hub 28. However, a small clearance 46 (FIG. 4) is provided between the sides of hub 28 and the inner periphery of the annular member 45, a similar clearance being provided between each side of the hub and the inner surface of the corresponding finger 29. The fingers 29 are removably secured to the annular member 45 by bolts 47, and both the fingers and the annular member 45 surround the hub 28 in closely spaced relation when these parts are in their lowered positions. The annular member 45 is bolted or otherwise secured to a head 48 in the form of an annular plate, the inner periphery of which is octagonal and in vertical alignment with the inner periphery of the member 45 and the inner surfaces of fingers 29. A locating pin 49 (FIG. 3) serves to maintain the interconnected parts 45 and 48 in the proper angular relation to each other.

The head 48 is reciprocable vertically and for this purpose is rigidly connected to vertical rods 50 which extend downwardly through bushings 51 in the bed plate 22, as shown in FIG. 1, the rods 50 serving to guide and actuate the head 48 and having a close sliding fit in the bushings 51. At their lower ends, the rods 50 are rigidly connected to a horizontal plate 52 below bed plate 22. The plate 52 is rigidly connected to a piston rod 53 extending upwardly from a cylinder or actuator 54, which may be similar to the actuator 32. The cylinder 54 is secured at its upper end to a bracket 55 which is rigidly connected by rods 56 to the bed plate 22, the plate 52 having holes through which the supporting rods 56 pass with a sliding fit.

When cylinder 54 is operated to raise piston rod 53 the plate 52 is raised relative to bracket 55, thereby raising the head 48 through the guide rods 50. This causes the inner tab-folding elements or fingers 29 to be raised through support opening 26 to the broken line position shown in FIG. 3. Conversely, upon lowering of piston rod 53 the fingers 29 are retracted from their raised positions to their normal positions shown in full lines in FIG. 3. Throughout these vertical movements, the guide rods 50 prevent angular displacement of fingers 29 relative to the corresponding sides of hub 28, so that each finger 29 is maintained parallel to the corresponding side of the hub. Also, the locating hub 28 and the head 48 for the tab-folding fingers 29 can be moved up and down relative to each other and in concentric relation by means of their respective actuators 32 and 54.

The pressing and tab-folding means 30 operable on the upper sheet 10 are supported on a bracket 58 secured to an extension of bed plate 22, as shown in FIG. 1. The means 30 comprise a horizontal head 59 adapted to be lowered and raised relative to bracket 58 by means of an actuator including a cylinder 60. The cylinder 60 is secured at its lower end to the upper portion of bracket 58 from which it extends upwardly. The cylinder 60 contains a piston provided with a rod (not shown) extending downwardly through the upper portion of bracket 58 and rigidly connected at its lower end to the head 59, the latter overlying the locating hub 28. Guide rods 61 are rigidly secured at their lower ends to the head 59 and extend upwardly through arms 62 rigidly connected to bracket 58, the guide rods 60 having a close sliding fit in the arms 62. At their upper ends, the guide rods 61 carry stop nuts 63 which, by engagement with the arms 62, limit the downward movement of head 59 by the actuator 60.

A flat ring 65 is rigidly secured to the lower surface of the upper head 59, as by means of bolts 66. A presser plate 67 in the form of a flat ring is located below the supporting ring 65 and is suspended from the latter by pins 68. The pins 68 are rigidly secured at their lower ends to the presser plate 67, into which they are threaded, and these pins extend upwardly through bushings 65a mounted in the ring 65 and in which the pins have close sliding fits (FIG. 3). At their upper ends, the pins 68 are provided with heads 68a which normally rest on top of the supporting ring 65, thereby suspending the presser plate 67 from the ring 65. A spring 69 is coiled around each pin 68 and is compressed between the presser plate 67 and its supporting ring 65. Thus, as the head 59 is lowered by operation of the cylinder actuator 60, the presser plate 67 is moved into engagement with the upper sheet member 10 around the locating hub 28 (FIG. 1) whereupon further downward movement of head 59 causes the presser plate 67 to yield relative to this head, thereby further compressing the springs 69 and compacting the carton members 10—10a and the annular article C between the support 24 and the presser plate 67.

The supporting ring 65 of the upper head 59 carries a series of eight tab-folding fingers 71, one for each of the eight inner tabs 13 on the upper sheet member 10. Each tab-folding finger 71 is mounted at its upper end on a horizontal pivot 72 forming part of a bracket 73 which is rigidly secured to the lower face of ring 65, as by means of a screw 74. Each pivot pin 72 extends parallel to a corresponding side of the octagonal locating hub 28, so that the corresponding finger 71 can swing to and from this side of the hub. The guide rods 61 serve to maintain this relationship of the pivot pins 72 relative to the hub 28, whereby the fingers 71 are suspended from head 59 in an octagonal pattern which is aligned angularly with the octagonal pattern of the locating hub 28.

A roller 75 is carried by each finger 71 and overlies the presser plate 67 between a pair of its suspending pins 68. Consequently, the rollers 75 are engageable with the upper surface of presser plate 67 by continued downward movement of head 59 after the presser plate has engaged the upper sheet 10 (FIG. 3).

Figures 5, 6, 7:
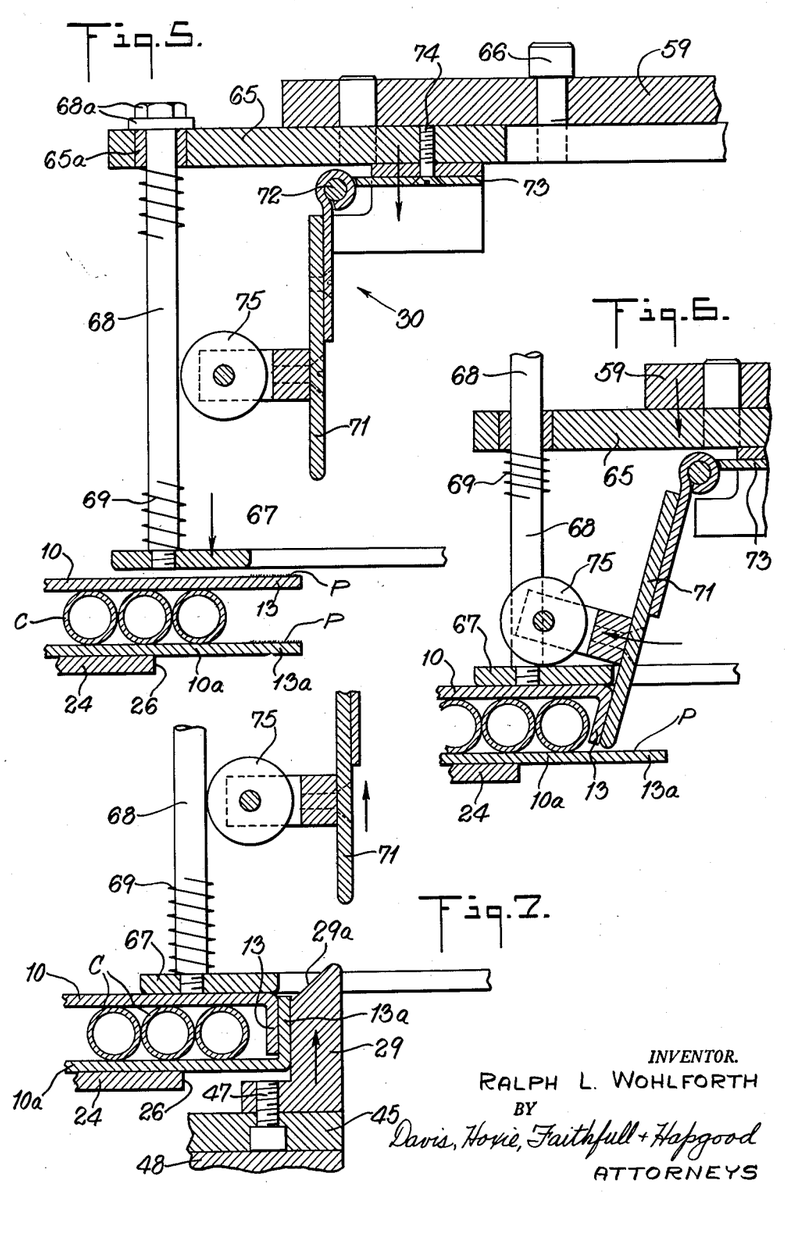
FIG. 5 is a detail view in vertical section showing the position of the presser and folding means just prior to engagement of the presser plate with the upper of the sheet-like members on the support of FIG. 1.
FIG. 6 is a view similar to FIG. 5 showing the parts upon completion of the folding of an inner tab on the upper sheet-like member.
FIG. 7 is a view similar to FIGS. 5 and 6 but showing the parts upon completion of the folding of the opposed tab on the lower sheet-like member.

In the operation of the inner tab-folding apparatus, the carton members 10—10a, with the annular article C therebetween, are first located on the support 24 by means of the locating hub 28, as previously described. The cylinder actuator 60 is then operated to lower the head 59 while the hub 28 is still in its upper or locating position (FIGS. 1 and 5). This causes the presser plate 67 to engage the upper sheet member 10 around the hub 28 but in spaced relation thereto, so as to clamp the carton members 10—10a and article C against the support 24. Then, as the head 59 continues to move downward, the presser plate 67 yields relative to head 59 so that the roller parts 75 on fingers 71 engage the upper surface of plate 67 (FIGS. 3 and 6). Prior to engagement of rollers 75 with plate 67, the lower ends of the corresponding fingers 71 engage the beveled edges 28a of hub 28 (FIG. 3) and are deflected outwardly into engagement with the inner tabs 13 of upper sheet member 10, causing these tabs to commence to fold downwardly about their respective fold lines 14 (FIG. 17). Thereafter, due to the camming action of rollers 75 on plate 67, the fingers 71 are swung outwardly as downward movement of head 59 continues, whereby the fingers fold the corresponding tabs 13 downwardly and inwardly through an angle somewhat greater than 90°. At this point, with each tab 13 folded downwardly to the position shown in FIG. 6, the cylinder actuator 60 is operated to arrest the downward movement of head 59.

The lower head 48 is now raised by operation of its cylinder actuator 54, thereby moving the fingers 59 upwardly into engagement with the inner tabs 13a of lower sheet member 10a (FIG. 3). Because of the beveled upper ends 29a of fingers 29, the tabs 13a are initially engaged by the "high" surfaces of these fingers adjacent the corresponding sides of locating hub 28, so that tabs 13a are folded upwardly and inwardly about the lower ends of the corresponding fingers 71 which are directly above the corresponding fold lines 14a of sheet member 10a (FIG. 18). As the tabs 13a approach the opposed flat sides of the corresponding upper fingers 71, the upper head 59 is raised by operation of its cylinder actuator 60, thereby withdrawing fingers 71 from the annular space between presser plate 67 and hub 28 and allowing the upper tabs 13 to swing outwardly somewhat due to their inherent resiliency. Accordingly, as the lower fingers 29 continue their upward movement, the lower tabs 13a are folded into overlapping relation to the corresponding opposed upper tabs 13, as illustrated in FIG. 7. The pressure thus created between the opposed overlapping tabs 13—13a is sufficient to cause them to adhere to each other by means of the adhesive P (FIGS. 16 and 18). It will be observed that during this final folding operation by the lower fingers 29, the presser plate 67 continues to clamp the sheet members 10—10a and article C against the support 24 (FIG. 7), since the upward movement of head 59 has not yet resulted in engagement of ring 65 with the heads 68a of the suspending pins 68.

The folding of the inner tabs being now completed, the fingers 29 are retracted to their lower position (FIG. 3) by operation of cylinder actuator 54, the upper head 59 continuing its upward movement to withdraw presser plate 67 from the upper sheet member 10. The locating hub 28 may be retracted below the support 24 by operation of its cylinder actuator 32, so that the partially assembled package can be removed from the support without lifting the package.

The operation of the cylinder actuators 60 and 54, to operate the respective heads 59 and 48 as previously described, may be affected automatically after initial operation of the cylinder actuator 60. For this purpose, a limit switch 77 is mounted on bracket 58 adjacent a vertical arm 78 which is secured at its lower end to the head 59 and projects upwardly through an opening in bracket 58. The switch 77 has a plunger 77a which is urged against the arm 78; and when the head 59 reaches its lowermost position as illustrated in FIG. 3, the plunger 77a enters a notch 78a in the arm 78 (FIG. 1), thereby opening switch 77 and cutting off the supply of fluid to cylinder 60, to which this switch is connected through a suitable operating connection (not shown). Through another operating connection (not shown) from switch 77 to cylinder actuator 54, such opening of switch 77 also admits pressure fluid to cylinder 54 so as to raise the lower head 48; and when the lower fingers 29 are raised to the point where the upper fingers 71 are to be withdrawn, as previously described, the head 48 actuates another switch (not shown) which causes pressure fluid to be admitted to cylinder 60 so as to raise the head 59. When the lower fingers 29 reach their uppermost positions (FIG. 7), the lower head 48 actuates still another switch (not shown) which cuts off the supply of fluid to the lower end of cylinder 54 and admits fluid to the upper end of this cylinder, so that the head 48 is retracted to its lowermost position below the support 24.

It will be apparent that the parts comprising the locating hub 28, lower fingers 29, upper fingers 71 and presser plate 67 may be replaced by similar parts adapted to accommodate carton members 10 and 10a of different sizes and configurations as regards their central openings 11.

Figure 8:
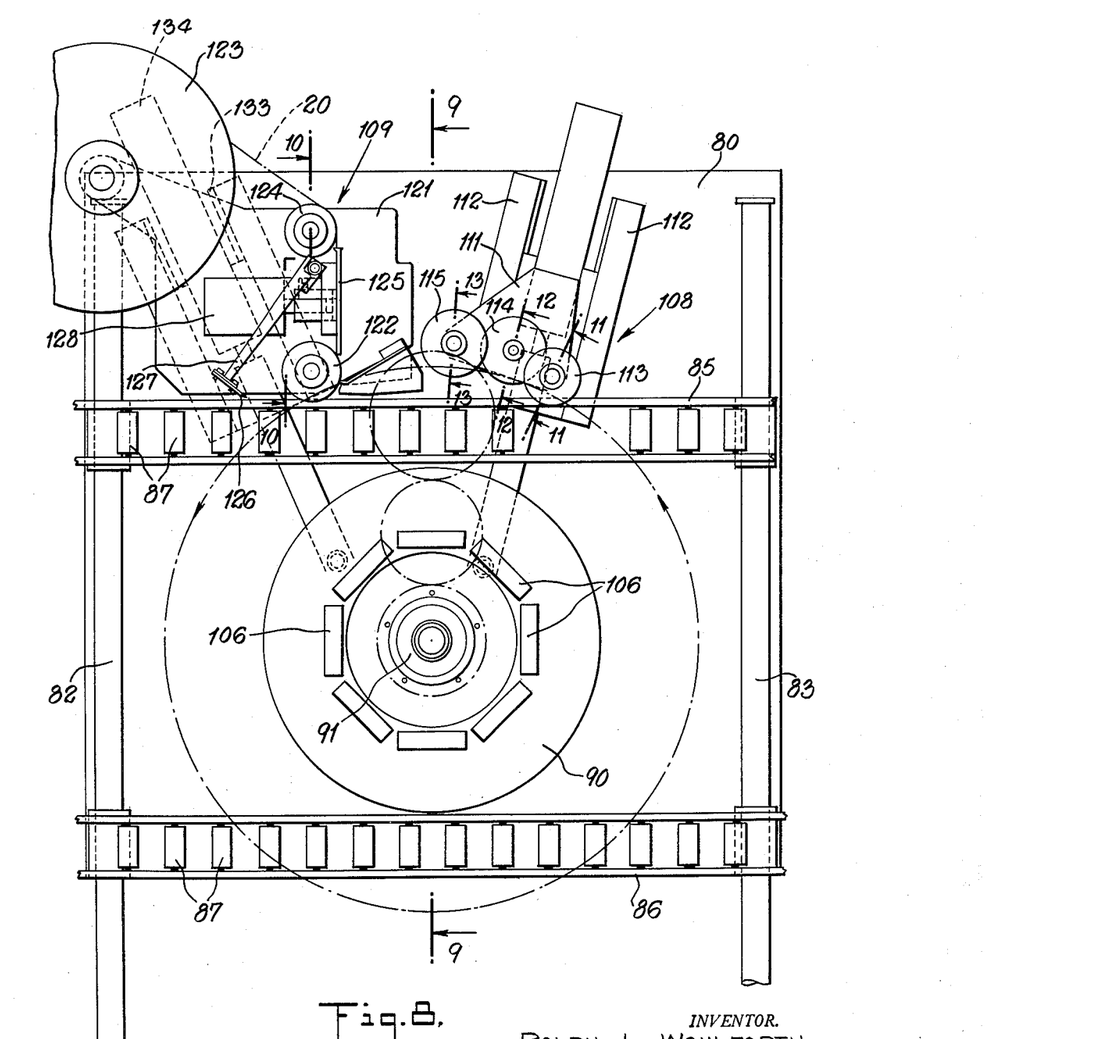
FIG. 8 is a plan view of that part of the apparatus which folds the outer tabs on the sheet-like members and then applies the tape thereto.
Figure 9:
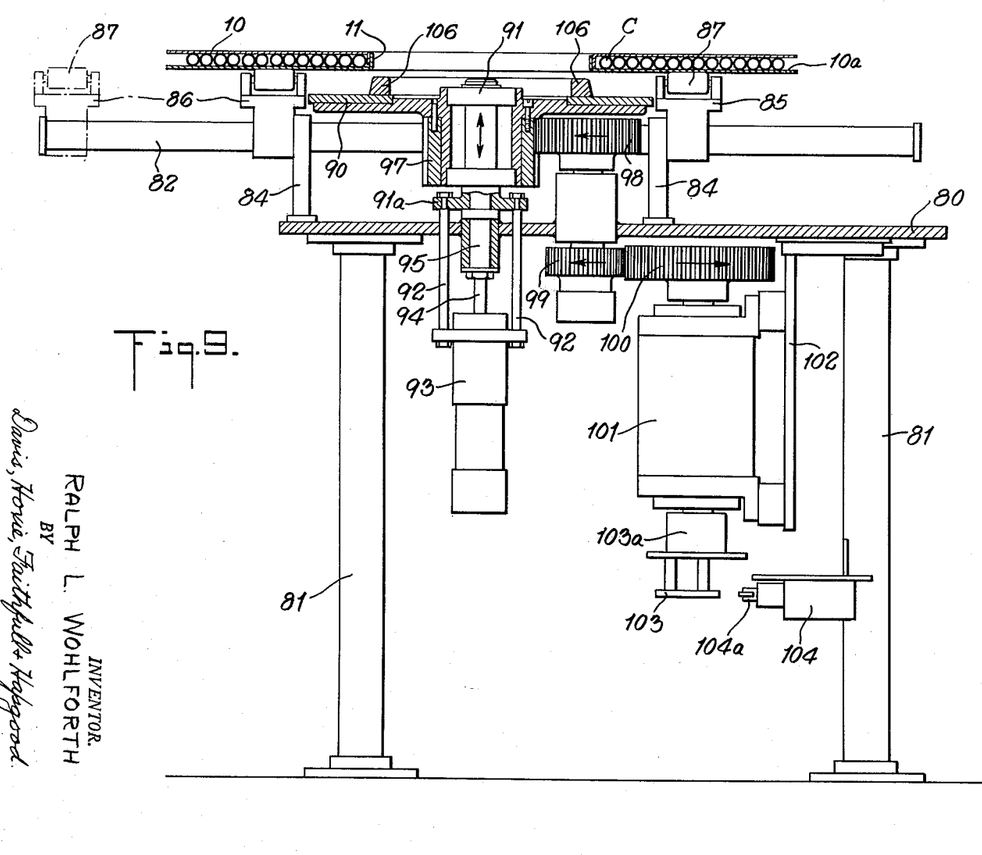
FIG. 9 is a vertical sectional view on the line 9—9 in FIG. 8.

The apparatus for folding the outer tabs 17—17a and applying the tape 20 will now be described. As shown in FIGS. 8 through 15, this apparatus comprises a bedplate 80 having legs 81 which support this plate on the floor (FIGS. 8 and 9). Two bars 82 and 83 are supported above the bedplate 80 by means of spacers 84 secured thereto, the bars 82 being horizontal and in parallel spaced relation to each other. Two crossbeams 85 and 86 are supported at their ends on the bars 82—83 and are slidable along these bars. Each of the beams 85—86 carries rollers 87 adapted to support the partially assembled carton, as shown in FIGS. 8 and 9. Thus, the parts 85—87 form a transfer device on which the partially assembled carton from the inner tab-folding apparatus is movable into overlying relation to a rotary table 90 (FIG. 9), the rollers 87 engaging the lower surface of the partially assembled carton near its central octagonal opening 11. By adjusting the spacing between the parallel beams 85—86, this transfer device may be adjusted to accommodate cartons having larger or smaller central openings 11.

The rotary table 90 is mounted on a central bearing assembly 91 (FIGS. 8 and 9). This bearing assembly has a bottom flange 91a rigidly secured to vertical guide rods 92. The latter extend downwardly through the bedplate 80, in which these rods have a close sliding fit, and are rigidly connected at their lower ends to the upper end of an actuator comprising a cylinder 93. A piston rod 94 extends upwardly from the piston (not shown) in cylinder 93 and is rigidly connected at its upper end to the bedplate 80 by a fixture 95.

By admitting pressure fluid to the upper end of the cylinder actuator 93, the rotary table 90 is raised through the guide rods 92 so as to engage the overlying carton (partially assembled) and lift it from the rollers 87. Conversely, upon completion of the carton assembly, the table 90 may be lowered to return the carton to the rollers 87, by admitting pressure fluid into the lower end of cylinder 93 or exhausting the fluid from the upper end of this cylinder.

The rotary table 90 is rigidly connected to an elongated pinion 97 located below the table proper and concentric to the bearing assembly 91. The pinion 97 is connected through a gear train 98—99—100 to an electric motor 101 secured to a bracket 102 which is mounted on the underside of bedplate 80. Due to the elongation of pinion 97, the driving connection between table 90 and motor 101 is maintained in both the raised and the lowered positions of the table. A limit switch 104 is secured to one of the supporting legs 81 and has a plunger 104a engageable by a cam 103. The latter is connected to the drive shaft of motor 101 through reduction gearing 103a. When the table 90 has been driven through a certain angle by motor 101, the cam 103 engages the plunger 104a so as to open switch 104 and de-energize the motor 101 through a suitable operating connection (not shown).

The rotary table 90 is provided on its upper surface with a series of elongated members 106 rigidly secured to the table and forming an octagonal configuration (FIG. 8). In effect, the members 106 form an octagonal hub which is adapted to be closely received in the central octagonal opening 11 of the partially assembled carton, with each side of this opening substantially engaging a corresponding side of the hub formed by one of the members 106. By adjusting the partially assembled carton on the rollers 87, to align the sides of the central opening 11 with the corresponding sides of the octagonal hub 106, the hub will enter this opening when the table is raised by the cylinder 93, whereby the carton is held centered on the table when the latter is rotated by motor 101.

Opposite the peripheral portion of the table 90, in its upper position, are two stations 108 and 109, the station 108 being an outer tab-folding station and the station 109 being a strip-applicator station. The direction of rotation of the table by motor 101 is counterclockwise as viewed in FIG. 8, so that the outer tabs of the partially assembled carton are moved first through the station 108 where each pair of opposed tabs on the respective sheet members 10—10a are folded toward each other, and then through the tape applicator station 109 where the tape 20 is applied to the outer tabs.

Figure 12:
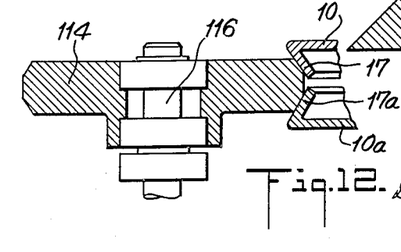
Figure 13:
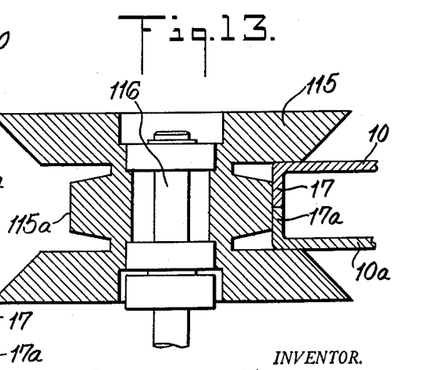

The outer tab-folding station 108 comprises a horizontal supporting plate 111 which is adjustable generally radially of the table on tracks 112. The plate 111 carries a series of three rollers 113, 114 and 115 which are freely rotatable on stub shafts 116 extending upwardly from the plate 111 and rigidly secured thereto (FIGS. 11–13).

Figure 11:
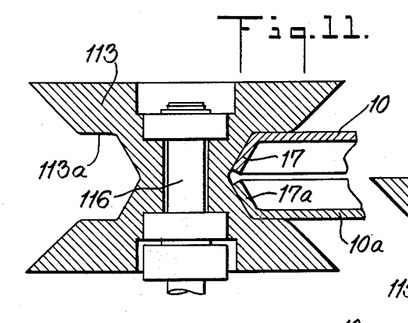

The roller 113, which is first engaged by the outer tabs, has a concave periphery forming an annular cavity 113a (FIG. 11). The second roller 114, next engaged by the outer tabs, has a convex periphery adapted to fit into the annular cavity 113a of the first roller without contacting this roller (FIGS. 8 and 12); and the third roller 115, which is next engaged by the outer tabs, has a concave periphery in the annular cavity of which is a ring 115a disposed opposite and in closely spaced relation to the periphery of roller 114 (FIGS. 8 and 13).

As the partially assembled carton is rotated on the table 90 in its elevated position, the outer tabs 17—17a engage the peripheral portions of the rollers 113, 114 and 115 in that order, thereby rotating these rollers clockwise as viewed in FIG. 8. Each pair of opposed outer tabs 17—17a, in moving past the first roller 113, are folded inwardly toward each other about their respective fold lines 18—18a (FIGS. 17–18), each tab being folded through an angle somewhat less than 90°, as shown in FIG. 11. More particularly the ends of the tabs are engaged by the two converging surfaces in the annular cavity 113a and displaced toward each other along these surfaces while the parallel outer surfaces of the cavity 113a hold the adjacent portions of the respective sheet members 10—10a in predetermined spaced relation corresponding to the thickness of the article C (FIG. 11). The partially folded tabs 17—17a then pass immediately to the second roller 114 which, because of the convex profile of its periphery, forces the tabs inwardly beyond the vertical, as shown in FIG. 12. When the tabs are released by the second roller 114, they pass to the third roller 115, the tabs in the meantime springing outwardly due to their inherent resiliency so that they engage the central ring 115a of the third roller as shown in FIG. 13. At the same time, the parallel opposed sides of the annular cavity in the periphery of roller 115 engage the sheet members 10—10a adjacent the tabs 17—17a so as to hold the ends of the opposed tabs in abutting relation (FIG. 13), this being the desired position of the tabs when the tape 20 is to be applied.

Figures 14, 15:
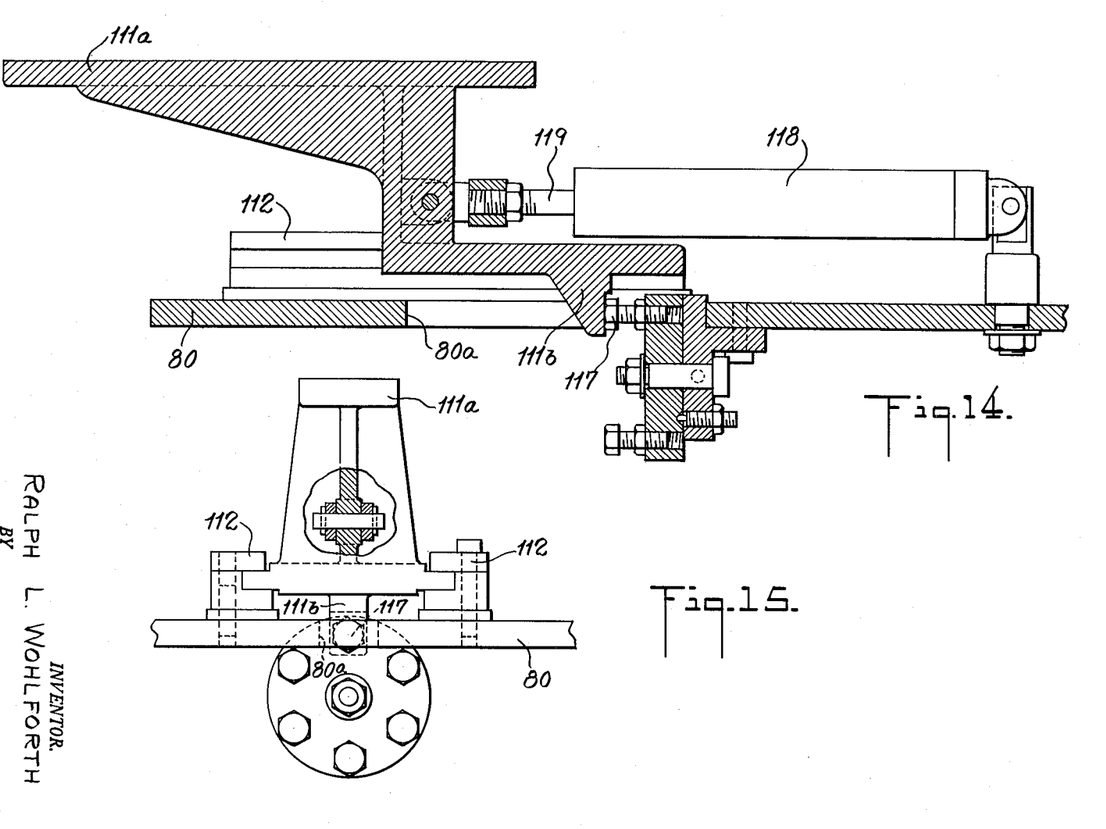
FIG. 14 is a vertical sectional view of part of the tab-folding station in FIG. 8, showing the slide arrangement for adjusting this station to accommodate different carton diameters.
FIG. 15 is an end view of the structure shown in FIG. 14 as seen from the left.

The supporting plate 111 of the tab-folding station 108 may be mounted in any suitable manner for adjustment on the tracks 112. As shown in FIGS. 14 and 15, the plate 111 is secured to or forms part of a slide 111a held in the tracks 112, the latter being secured to the bedplate 80. Movement of slide 111a and plate 111 away from table 90 is limited by a stop 117, and their inward movement toward the table is limited by the forward end of slot 80a into which a detent 111b on slide 111a extends. The slide 111a may be moved back and forth, within the limits indicated, by an actuator comprising a cylinder 118 secured to the bedplate 80 and containing a piston (not shown) having a rod 119 connected to the slide 111a.

When the table 90 is raised to lift the partially assembled carton from the rollers 87, the plate 111 and slide 111a are retracted on the tracks 112 (FIG. 4). With the table in its raised position, the plate 111 is advanced toward the table by operation of the cylinder actuator 118, thereby engaging the first roller 113 with the adjacent pair of opposed outer tabs 17—17a and folding these tabs to the position shown in FIG. 11. At this time, the unfolded outer tabs opposite the rollers 114 and 115 will not be engaged by these rollers, since the unfolded tabs will straddle the roller 114 and will lie in the corresponding annular recesses at the sides of the central ring 115a of roller 115. However, as the table 90 now commences to rotate following the movement of plate 111 to its innermost position on tracks 112, the partially folded tabs from the first roller 113 will be further folded and compressed into abutting relation by the subsequent rollers 114—115 as shown in FIGS. 12 and 13. Upon completion of the outer tab-folding and tape-applying operations, the plate 111 is retracted to its outermost position on tracks 112, by operation of cylinder 118, thereby disengaging the rollers 113—115 from the carton so that the latter may be lowered onto the transfer device 85—87.

The slide 111a may be adjustably connected to the piston rod 119, as shown in FIG. 14, to accommodate cartons of different outer diameters.

Figure 10:
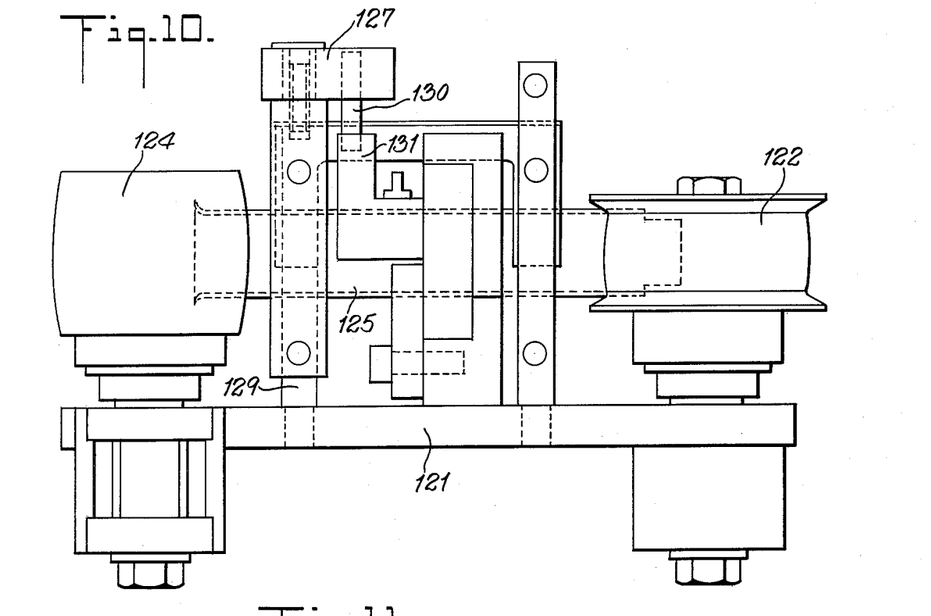
FIGS. 10, 11, 12 and 13 are sectional views on the lines 10—10, 11—11, 12—12 and 13—13, respectively, in FIG. 8.

The tape-applicator station 109 comprises a horizontal supporting plate 121 on which a roller 122 is mounted above the plate. The periphery of roller 122 has a generally concave profile, although the central portion of the profile is slightly convex as shown in FIG. 10. The folded outer tabs from roller 115 pass to the roller 122 which continues to hold the ends of the tabs in abutting relation while pressing the tape 20 against the folded tabs. This tape is supplied from a spool 123 rotatably mounted on the plate 121. The tape passes from spool 123 partly around a guide roller 124 and through a tape guide 125 from which the tape is delivered to the pressing roller 122. As the table 90 rotates, and with the leading end of the tape secured by adhesive to the folded tabs, the tape is automatically drawn from the supply reel 123 and pressed against the folded tabs by the roller 122.

The supporting plate 121 also carries a tape cutter 126 secured to the end of a horizontal swinging arm 127. The arm 127 is normally in its retracted position shown in FIG. 8 but is adapted to be swung into tape-cutting position by an actuator 128, which may be a cylinder or a solenoid. As best shown in FIG. 10, the cutter arm 127 is adapted to swing on a post 129 secured to plate 121 and is operatively connected to the actuator 128 through suitable connecting parts 130—131.

The supporting plate 121 of the tape-applicator station may be slidable on tracks 133 generally radially of the table 90, as in the case of the supporting plate 111 of the outer tab-folding station. Likewise, the plate 121 may be advanced and retracted on its tracks 133 by a suitable actuator 134 similar to the actuator 118.

In the operation of the apparatus for folding the outer tabs and applying the tape, the partially assembled carton 10—C—10a is lifted from the transfer device 85—87 by operating the cylinder actuator 93 to raise the table 90, as previously described, the carton being held centered on the table by engagement of the octagonal hub 106 in the octagonal central opening 11 of the carton. The plate 111 of tab-folding station 108 is then advanced on its tracks 112 to engage the first roller 113 with the adjacent pair of opposed tabs 17—17a and initially fold them toward each other as shown in FIG. 11, the slide or plate 111 being held in this advanced position by the cylinder actuator 118. The table 90 is then rotated counterclockwise (FIG. 8) by starting the motor 101, whereby the tabs are moved from roller 113 past rollers 114, 115 and 122 in that order. Just before the first pair of folded tabs reaches the roller 122, the adjacent end of the tape 20 from tape guide 125 is contacted with these tabs so that the end of the tape adheres to them, it being understood that the tape is provided on is inner face with a pressure-sensitive adhesive. Thus, as the table 90 continues to rotate, the tape is drawn between the folded outer tabs and the pressure roller 122 so that the latter presses the tape against the folded tabs to obtain a good adhesion between the tabs and the tape. When the table has rotated through somewhat more than a full revolution so that the leading end of the tape again passes the pressure roller 122, the motor 101 is de-energized and the actuator 128 is operated to swing the cutter arm 127 counterclockwise (FIG. 8) so as to cut through the overlapping layer of tape 20 on the carton periphery. The slides or plates 111 and 121 are then retracted to disengage the rollers from the peripheral portion of the assembled carton. When the pressure roller 122 is so disengaged, the tape 20 which has been cut from the lagging end of the tape on the carton may be stripped from the underlying tape, and this stripped portion may be cut from the fresh tape so that the latter is ready to be applied to the next carton.

When the packaging operations are completed as described above, the cylinder actuator 93 is operated to lower the table 90 so that the finished carton rests on the transfer device 85—87 and the hub 106 is withdrawn from the carton opening 11. The carton may then be removed from the apparatus by moving the carton along the rollers 87.

I claim:

1. Apparatus for packaging an annular article between two opposed sheet-like members of generally annular form each having an inner peripheral portion provided with a series of inner tabs defining a central polygonal opening, each inner tab being substantially longer than one-half the article thickness, each member also having an outer peripheral portion provided with a series of outer tabs of a length not exceeding one-half of said thickness, the apparatus comprising a support engageable with one of said members and adapted to support said one member and the article thereon, the support having an opening, a head mounted for reciprocating movements relative to the support, pressing and folding means carried by the head and operable in response to movement of the head toward the support to press the other of said members against the article and fold the inner tabs of said other member toward said support opening, a second head mounted for reciprocating movements relative to the support and the first head, folding elements carried by the second head and movable thereby through the support opening to fold the inner tabs of said one member toward the first head, whereby said members are partially assembled around the article with the folded inner tabs of the respective members in overlapping relation and defining a central opening substantially larger than said polygonal openings defined by the unfolded tabs, a rotary table for supporting said partial assembly of members around the article, an outer tab folding station, a tape applicator station, said stations being located in adjacent relation opposite the peripheral portion of the table, a hub on the table engageable closely in said larger central opening to locate said partial assembly on the table in relation to said stations, and means for driving the table in the direction to move the outer tabs of said partial assembly first through said folding station and then through said applicator station.

2. Apparatus according to claim 1, comprising also means mounting said stations for adjustment relative to the table to accommodate different diameters of said partial assembly.

3. Apparatus according to claim 1, comprising also a polygonal locating hub adapted to fit in said polygonal openings of the members, and means mounting said last hub for movement through the support opening into position for locating said members on the support.

4. Apparatus according to claim 1, comprising also a transfer device on which said partial assembly is movable into overlying relation to the rotary table, and means for elevating the table relative to said device to lift the partial assembly into cooperative relation to said stations.

5. Apparatus according to claim 1, comprising also a polygonal locating hub adapted to fit in said polygonal openings of the members, means for elevating said last hub through the support opening into position for locating said members on the support, a transfer device on which said partial assembly is movable into overlying relation to the rotary table, and means for elevating the table relative to said device to lift the partial assembly into cooperative relation to said stations.

6. Apparatus for packaging an annular article between two opposed sheet-like members of generally annular form defining a central opening through the members, each member having an outer peripheral portion provided with a series of outer tabs of a length not exceeding the article thickness, the apparatus comprising a rotary table for supporting said members with the article between the members, an outer tab-folding station, a tape applicator station, said stations being located in adjacent relation opposite the peripheral portion of the table, a hub on the table engageable closely in said central opening through the members to locate the members on the table in relation to said stations, and means for driving the table in the direction to move the outer tabs of the members first through the folding and then through said applicator station.

7. Apparatus according to claim 6, in which the folding station includes a plurality of rollers rotatable on axes parallel to the table axis and having peripheries engageable consecutively by each pair of opposed tabs on the respective members as the table rotates, one of said rollers having a concave periphery for folding the opposed tabs toward each other less than 90°, and a subsequent roller having a periphery formed to fold the opposed tabs further to more than 90° from the planes of the respective members.

8. Apparatus according to claim 6, in which the folding station includes a plurality of rollers rotatable on axes parallel to the table axis and having peripheries engageable consecutively by each pair of opposed tabs on the respective members as the table rotates, one of said rollers having a periphery formed to fold the opposed tabs inwardly to more than 90° from the planes of the respective members, and a subsequent roller having a concave periphery for clamping the opposed tabs into abutting relation at their ends while holding the tabs substantially perpendicular to the planes of the respective members.

9. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configurated to fold the opposed tabs progressively inwardly through at least 90° from the planes of the respective members, a common support for said rollers, and means mounting said support for adjustment generally radially of the table.

10. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configurated to fold the opposed tabs progressively inwardly through at least 90° from the planes of the respective members, the applicator station including a pressure roller to which the folded tabs move from the folding station and operable to press a tape against the folded tabs.

11. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configurated to fold the opposed tabs progressively inwardly through at least 90° from the planes of the respective members, the applicator station including a pressure roller to which the folded tabs move from the folding station and operable to press a tape against the folded tabs, and a tape supply roll for delivering tape to said pressure roller.

12. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configured to fold the opposed tabs progressively inwardly through at least 90° from the planes of the respective members, the applicator station including a pressure roller to which the folded tabs move from the folding station and operable to press a tape against the folded tabs, and a tape cutter movable to a position for cutting the tape from the pressure roller.

13. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configured to fold the opposed tabs progressively inwardly through at least 90° from the planes of the respective members, the applicator station including a pressure roller to which the folded tabs move from the folding station and operable to press a tape against the folded tabs, a tape supply roll for delivering tape to the pressure roller, a common support for said pressure roller and tape supply roll, and means mounting said support for adjustment generally radially of the table.

14. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configured to fold the opposed tabs progressively inwardly through at least 90° from the planes of the respective members, the applicator station including a pressure roller to which the folded tabs move from the folding station and operable to press a tape against the folded tabs, a tape cutter movable to a position for cutting the tape from the pressure roller, a common support for said pressure roller and tape cutter, and means mounting said support for adjustment generally radially of the table.

15. Apparatus according to claim 6, in which the folding station includes a plurality of rollers rotatable on axes parallel to the table axis and having peripheries engageable consecutively by each pair of opposed tabs on the respective members as the table rotates, said rollers having peripheries configured to fold the opposed tabs progressively inwardly through at least 90° from the planes of the respective members, a common support for said rollers and means mounting said support for adjustment generally radially of the table, the applicator station including a pressure roller to which the folded tabs move from the folding station and operable to press a tape against the folded tabs, a tape cutter movable to a position for cutting the tape from the pressure roller, a second support common to said pressure roller and cutter, and means mounting said second support for adjustment generally radially of the table.

16. Apparatus according to claim 6, comprising also a transfer device on which said members with the article therebetween are movable into overlying relation to the rotary table, and means for elevating the rotary table relative to said device to lift said members into cooperative relation to said stations.

17. Apparatus for packaging an annular article between two opposed sheet-like members of generally annular form each having an inner peripheral portion provided with a series of inner tabs defining a central polygonal opening, each inner tab being substantially longer than one-half the article thickness, the apparatus comprising a support having an opening therein and adapted to support said members with the article therebetween and with one of said members engaging the support around said opening, first tab folding elements movable relative to the support to fold the inner tabs of the other member toward said support opening and into the annular article between said members, second tab folding elements movable relative to the support through said support opening to fold the inner tabs of said one member toward said first folding elements, and locating means adjacent the support for positioning said members with each side of each polygonal opening substantially parallel to a side of the other polygonal opening and to a corresponding tab folding element, and with said polygonal openings in alignment with the support opening, whereby the folding elements are operable to fold the inner tabs of the respective members into overlapping relation to define a central polygonal opening substantially larger than said polygonal openings defined by the unfolded tabs.

18. Apparatus according to claim 17, in which said locating means includes a polygonal hub adapted to fit in said polygonal openings of the members while forming a generally annular space within the support opening, said second folding elements being movable through said annular space and in substantially surrounding relation to the hub.

19. Apparatus for packaging an annular article between two opposed sheet-like members of generally annular form each having an inner peripheral portion provided with a series of inner tabs defining a central polygonal opening, each inner tab being substantially longer than one-half the article thickness, the apparatus comprising a support engageable with one of said members and adapted to support said one member and the article thereon, the support having an opening, a first head mounted for reciprocating movements relative to the support, pressing and folding means carried by the head and operable in response to movement of the head toward the support to press the other of said members against the article and fold the inner tabs of said other member toward said support opening, a second head mounted for reciprocating movements relative to the support and the first head, and tab folding elements carried by the second head and movable thereby through the support opening to fold the inner tabs of said one member toward the first head, whereby the inner tabs of the respective members are folded into overlapping relation to define a central opening substantially larger than said polygonal openings defined by the unfolded tabs, said pressing and folding means including a yielding presser plate carried by the first head and engageable with said other member around its polygonal opening, the plate being yieldable relative to the first head upon advance movement thereof toward the support when said members and articles are compacted between the support and plate, and fingers pivotally mounted on the first head and having parts engageable with the plate to swing the fingers outwardly against the tabs of said other member in response to said advance movement of the first head.

20. Apparatus according to claim 19, in which said parts are rollers.

21. Apparatus according to claim 19, comprising also biasing means urging the yielding plate toward the support relative to the first head.

22. Apparatus according to claim 19, comprising also a polygonal locating hub adapted to fit in said polygonal openings of the members, said folding elements forming a chamber for receiving the hub, and means mounting the hub for movement from said chamber through the support opening into position for locating said members on the support, said fingers being movable against the corresponding tabs and said folding elements being movable through the support opening while the hub is in said locating position.

23. Apparatus according to claim 19, comprising also a polygonal locating hub adapted to fit in said polygonal openings of the members and operable to locate said members on the support, said fingers and folding elements being movable alternately into concentric relation to the hub.

24. Apparatus according to claim 19, comprising also a polygonal locating hub adapted to fit in said polygonal openings of the members and operable to locate said members on the support, said fingers being movable into concentric relation to the hub in response to said advance movement of the first head and forming fulcrums about which the inner tabs of said one member are folded by said movement of the folding elements through the support opening.

25. Apparatus according to claim 17, in which said locating means include a polygonal hub adapted to fit in said polygonal openings of the members, said folding elements forming a chamber for receiving the hub, and means mounting the hub for movement from said chamber through the support opening into position for locating said members on the support.

26. Apparatus according to claim 17, in which said locating means include a polygonal hub adapted to fit in said polygonal openings of the members, said folding elements forming a chamber for receiving the hub, and means mounting the hub for movement from said chamber through the support opening into position for locating said members on the support, said second folding elements being movable through the support opening while the hub is in said locating position.

27. Apparatus according to claim 17, comprising also a yielding presser plate mounted for reciprocating movements toward and away from said support and engageable with said other sheet-like member to press said members and article against the support during said folding operations of the tab folding elements.

References Cited in the file of this patent

UNITED STATES PATENTS 1,354,371   Angier _______________ Sept. 28, 1920